United States Patent
Hofmeister

[15] 3,666,213
[45] May 30, 1972

[54] FLIGHT CONTROL SYSTEM INCLUDING AUTOMATIC ALTITUDE LOCKING MEANS

[72] Inventor: Laurence C. Hofmeister, Ferndale, Mich.
[73] Assignee: The Bendix Corporation
[22] Filed: May 15, 1970
[21] Appl. No.: 37,550

[52] U.S. Cl. ..........................244/77 D, 244/77 SE, 318/584
[51] Int. Cl. ..........................................................B64c 13/18
[58] Field of Search ....................244/77, 77 A, 77 D, 77 SE; 318/584

[56] References Cited

UNITED STATES PATENTS

| | | |
|---|---|---|
| 2,889,509 | 6/1959 | Gorzelany et al. ...............244/77 D X |
| 2,873,418 | 2/1959 | Owen.........................244/77 D X |
| 3,062,486 | 11/1962 | Shepherd........................244/77 SE |
| 3,002,713 | 10/1961 | Noxon et al......................244/77 SE |
| 2,633,315 | 3/1953 | Rossire ..............................244/77 D |
| 2,975,351 | 3/1961 | Wegley .........................244/77 D X |
| 3,079,109 | 2/1963 | Jude et al. ..........................244/77 SE |

Primary Examiner—Milton Buchler
Assistant Examiner—Jeffrey L. Forman
Attorney—Plante, Arens, Hartz, Smith & Thompson, Bruce L. Lamb and William G. Christoforo

[57] ABSTRACT

A flight control system includes a manually operated pitch command selector arranged for automatically engaging and locking the system in an altitude hold mode when pitch command is zero to eliminate pilot engagement of said altitude hold mode.

2 Claims, 3 Drawing Figures

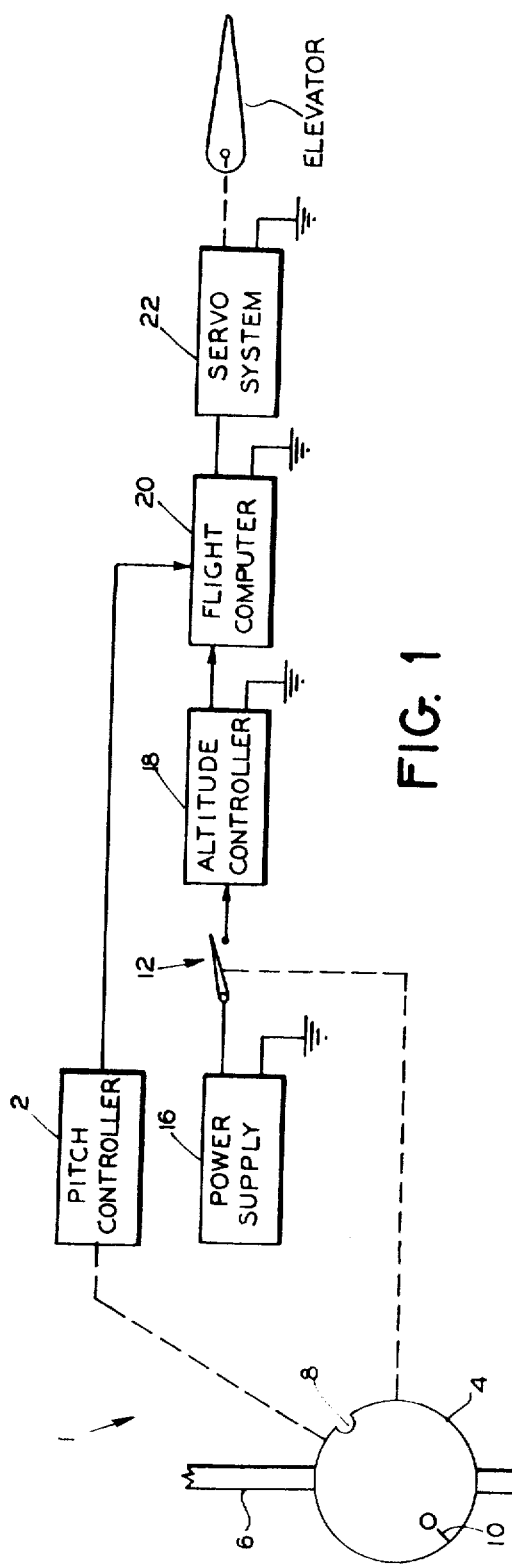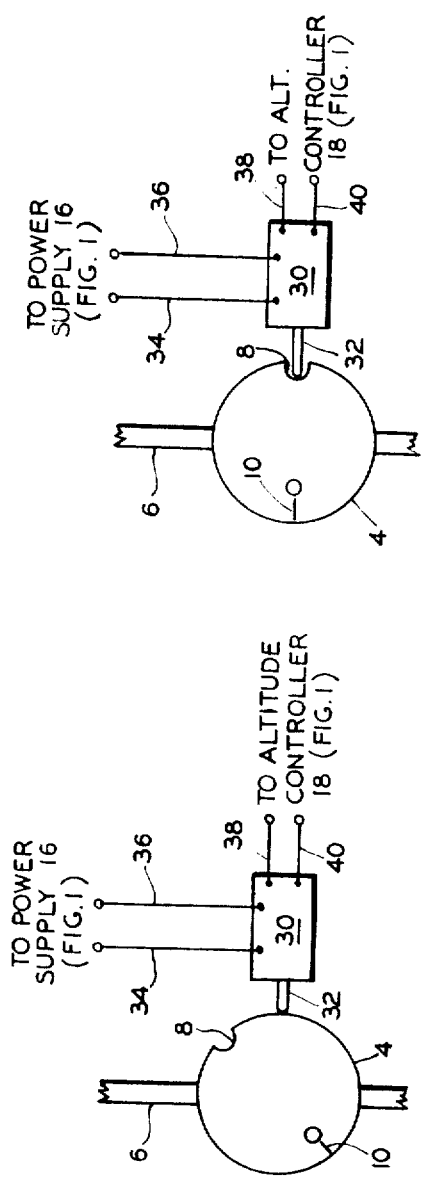
INVENTOR.
LAURENCE C. HOFMEISTER

FLIGHT CONTROL SYSTEM INCLUDING AUTOMATIC ALTITUDE LOCKING MEANS

BACKGROUND OF THE INVENTION

1. Field of the Invention

This invention relates to aircraft control systems and particularly, to systems for controlling the craft in pitch command and altitude hold modes of flight. More particularly, this invention relates to systems of the type described wherein pilot work load is reduced.

2. Description of the Prior Art

Modern automatically controlled aircraft require that the pilot sequentially perform many operations for safely arriving at a given destination. As more sophisticated equipment is added to the control system, the ability of the pilot to efficiently and safely perform these operations is approaching a limit.

In order to reduce the pilot's work load, it is desirable to eliminate pilot engagement of certain flight modes while retaining these modes in the control system. To this end, the present invention provides means for automatically engaging and locking the control system in the altitude hold mode of flight when pitch command is zero and eliminates pilot engagement of said altitude hold mode.

SUMMARY OF THE INVENTION

A flight control system includes a pitch command selector having a thumb wheel which is accessible to the pilot for commanding pitch attitude. The thumb wheel is arranged for actuating a switch to operate an altitude controller. When the thumb wheel is in any position other than zero pitch, the switch is actuated to disengage the altitude controller. When the thumb wheel is in zero pitch position, the switch is actuated to engage the altitude controller, whereby the control system locks in the altitude hold mode of flight.

One object of this invention is to provide a system for automatically controlling an aircraft in pitch command and altitude hold modes of flight.

Another object of this invention is to reduce pilot work load in operating said system by automatically engaging the altitude hold mode of flight when pitch command is zero.

Another object of this invention is to arrange a pitch command selector for automatically engaging and locking the control system in the altitude hold mode when pitch command is zero and for disengaging the altitude hold mode when the pitch command is other than zero.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

FIG. 1 is a block diagram showing an aircraft control system in accordance with the invention.

FIG. 2 is a diagrammatic representation showing a pitch command selector arranged for disengaging the altitude hold mode of flight.

FIG. 3 is a diagrammatic representation showing the pitch command selector arranged for engaging the altitude hold mode of flight.

DESCRIPTION OF THE INVENTION

FIG. 1 shows a pitch command selector designated generally by the numeral 1 and including a pitch controller 2 manually operated by a thumb wheel 4. Thumb wheel 4 protrudes from an instrument panel 6 so as to be accessible to the pilot for commanding the pitch attitude of an aircraft. Thumb wheel 4 has, for purposes which will be hereinafter described, a notch or groove 8 opposite the zero pitch or center position, and which position is indicated on thumb wheel 4 by an inscribed line 10.

Thumb wheel 4 is coupled to a switch 12. When the thumb wheel is in any position other than zero pitch, switch 12 is maintained in the open position to disconnect an aircraft power supply 16 from an altitude controller 18. With power supply 16 so disconnected, altitude controller 18 is ineffective for controlling the aircraft. During this time the pitch attitude of the craft is controlled by pitch controller 2 which provides a signal corresponding to the commanded pitch. The pitch command signal is applied to a flight computer 20 which provides an elevator control signal. The elevator control signal is applied to a servo system 22 which is connected by suitable mechanical means to elevator 14 for operating the elevator in accordance with the control signal.

When thumb wheel 4 is in zero pitch position (FIG. 3) switch 12 is closed thereby connecting power supply 16 to altitude controller 18 for energizing the altitude controller. Altitude controller 18 provides an altitude command signal which is applied to flight computer 20 for providing an elevator control signal, and the elevator control signal drives servo system 22 for operating elevator 14 to maintain the aircraft at a desired altitude.

Pitch selector 1, altitude controller 18, flight computer 20 and servo system 22 are devices well known in the art and it is not deemed necessary, for purposes of describing the present invention, to fully describe their operation.

By way of illustration only, pitch selector 1 may be a device such as described in U.S. Pat. No. 2,879,015 to Ardia, and which patent describes a controller including a manually operated thumb wheel for changing the pitch attitude of the craft.

Altitude controller 18 may be a device including an altitude sensor, and which device automatically maintains an aircraft at a desired altitude level such as described in U.S. Pat. No. 2,512,902 to Rossire.

Likewise, flight computer 20 may be a device which takes into account various parameters for providing a controlling output to give optimum aircraft performance. A computer of this type is described in U.S. Pat. No. 2,950,076 to Shirey, et al.

Servo system 22 is of the type including a servo amplifier, a servo motor for driving a rate generator and appropriate follow-up means such as described in the aforenoted U.S. Pat. No. 2,879,015.

All of the aforenoted patents are assigned to The Bendix Corporation, assignee of the present invention.

FIGS. 2 and 3 show a preferred embodiment of the invention wherein thumb wheel 4 is, in effect, a cam for actuating a plunger 32 of a conventional and commercially available micro-switch 30. Micro-switch 30 has a pair of input conductors 34 and 36 leading to power supply 16 and a pair of output conductors 38 and 40 leading to altitude controller 18, said power supply and altitude controller being shown in FIG. 1.

With specific reference now to FIG. 2, when thumb wheel 4 is in any position other than zero pitch as shown in the figure, plunger 32 is depressed holding switch 30 open and disconnecting power supply 16 from altitude controller 18. When thumb wheel 4 is in the zero pitch position, (FIG. 3) switch plunger 32 drops into notch 8 on thumb wheel 4 closing switch 30 and connecting power supply 16 to altitude controller 18.

The obvious advantage to the system of the invention is that to engage the altitude hold mode of flight no effort is required from the pilot other than operation of pitch command selector 1. After take-off and upon engagement of the automatic control system, the pilot selects a desired pitch angle through thumb wheel 4 and the aircraft continues to ascend or descend, as the case may be, until the desired altitude is reached, and whereupon the pilot has two options. One, the pilot can center thumb wheel 4, thereby bringing the craft back to the altitude at which the command was centered or two, he can smoothly roll thumb wheel 4 to zero pitch (level flight) whereupon altitude controller 18 will engage and the system will be locked in the altitude hold mode. In both cases the pilot does not have to engage the altitude hold mode after leveling.

Although only one embodiment of the invention has been illustrated and described, various changes in the form and relative arrangements of the parts, which will now appear obvious to those skilled in the art may be made without departing from the scope of the invention. Reference is, therefore, to be had to the appended claims for a definition of the limits of the invention.

What is claimed is:

1. An aircraft control system comprising:

means selectively operated by the pilot for commanding the aircraft attitude;

first means in cooperative arrangement with the pilot operated means for providing a first signal corresponding to the selected command;

a power supply a signal device for generating a second signal corresponding to the displacement of the craft from a reference when the signal device is connected to the power supply;

a switch connecting the power supply to the signal device when the switch is closed, the switch including a movable member, with the switch being opened to disconnect the power supply from the signal device when the movable member is in a first position and closed when the member is in a second position, the pilot operated means providing a cam surface with the movable switch member riding thereon, and the cam surface being arranged to displace the movable member from the first to second position when the pilot operated means is selectively operated to command zero attitude;

control signal means connected to the first means and to the signal device for providing a first control signal in response to the first signal and for providing a second control signal in response to the second signal; and control means connected to the control signal means and responsive to the first control signal for controlling the attitude of the craft, and responsive to the second control signal for controlling the craft to hold at the displacement from the reference.

2. An aircraft control system comprising:

command signal means including a thumb wheel selectively positioned by the pilot of the craft for commanding pitch attitude and having a groove opposite the zero pitch position, and means operably connected to the thumb wheel for providing a signal corresponding to the selected pitch command;

a power supply;

an altitude controller;

a normally open switch connecting the power supply to the altitude controller and including a movable member in a first position when the switch is open and in a second position when the switch is closed, and said thumb wheel and switch being so arranged that when zero pitch command is selected the movable switch member drops into the groove on the thumb wheel to move from the first position to the second position to close said switch and to connect the power supply to the altitude controller for rendering said controller effective for providing a signal corresponding to the altitude of the craft;

control signal means connected to the command signal means and to the altitude controller for providing a first control signal in response to the command signal and for providing a second control signal in response to the altitude signal; and control means connected to the control signal means and responsive to the first control signal for controlling the pitch of the craft and responsive to the second control signal for controlling the craft to hold at the zero pitch altitude.

* * * * *